United States Patent [19]

Bowman et al.

[11] Patent Number: 5,036,520
[45] Date of Patent: Jul. 30, 1991

[54] HOLMIUM LASER PUMPED WITH A NEODYMIUM LASER

[75] Inventors: Steven R. Bowman, Galesville; William S. Rabinovich, Wheaton, both of Md.

[73] Assignee: The United States of America as represented by the Secretary of the Navy, Washington, D.C.

[21] Appl. No.: 597,127

[22] Filed: Oct. 15, 1990

[51] Int. Cl.⁵ .......................... H01S 3/16; H01S 3/17
[52] U.S. Cl. ........................................ 372/41; 372/40; 372/71; 372/101
[58] Field of Search ...................... 372/40, 41, 68, 70, 372/71, 72, 101; 606/0.2, 0.3, 0.10, 0.11, 0.12; 128/303.1

[56] References Cited

U.S. PATENT DOCUMENTS

| | | | |
|---|---|---|---|
| 3,715,683 | 2/1973 | Weber | 372/68 |
| 4,054,852 | 10/1977 | Nicolai | 372/41 |
| 4,110,702 | 8/1978 | Chicklis | 372/41 |
| 4,321,559 | 3/1982 | Esterowitz et al. | 372/41 |
| 4,701,928 | 10/1987 | Fan et al. | 372/68 |
| 4,852,567 | 8/1989 | Sinofsky | 606/3 |
| 4,967,416 | 10/1990 | Esterowitz et al. | 372/6 |
| 4,974,230 | 11/1990 | Hemmati | 372/41 |

Primary Examiner—Frank Gonzalez
Assistant Examiner—Galen J. Hansen
Attorney, Agent, or Firm—Thomas E. McDonnell; George Jameson

[57] ABSTRACT

A solid-state laser device includes a neodymium laser pump source capable of outputting a pump beam of about 1.1 μm wavelength, and a holmium laser being pumped by said 1.1 μm pump beam to generate an output laser beam of about 3 μm wavelength.

12 Claims, 1 Drawing Sheet

HOLMIUM LASER PUMPED WITH A NEODYMIUM LASER

BACKGROUND OF THE INVENTION

1. Field of the Invention

The present invention relates generally to the field of solid-state lasers and, more specifically, to a holmium laser pumped with a neodymium laser.

2. Description of the Prior Art

In solid-state lasers, a light-emitting element is added as a dopant to a compound that serves as a crystalline or amorphous host. The characteristics of the solid-state laser depend on the dopant and crystalline compounds that are selected. The best light emitting dopant materials include chromium, neodymium, erbium, holmium, cerium, cobalt and titanium. One of the most common types of solid-state lasers is that which is made from the neodymium dopant.

All laser materials have characteristic energy levels and transitions so that light is emitted on certain transitions when they drop from excited states. Likewise, the materials absorb light at characteristic wavelengths when they are in the ground state or other low levels.

Absorption can be at a narrow or broad range of wavelengths depending on the transitions involved. Laser operation on the holmium $^5I_6$ to $^5I_7$, and $^5I_7$ to $^5I_8$ transitions have been reported at near 2.9 and 2.1 μm in several different host crystals. Holmium has few absorption bands for pumping in the visible and near-IR (infrared). Consequently, laser performances using broad spectral emission pump sources have been poor except where additional sensitizer ions have been used. The $^5I_8$ to $^5I_6$ holmium absorption spectra for a typical laser host material (Yttrium Ortho-Aluminate) is shown in FIG. 1. In the example, the crystal is 7.8 cm long and contains 2% (atomic %) holmium. Due to the potential medical applications and other commercial uses of 3 μm wavelength lasers, a need exists for an efficient, high power, solid-state pumping source for a holmium laser.

SUMMARY OF THE INVENTION

An object of the present invention is to provide a laser device using a holmium laser pumped by a neodymium laser.

Another object of the present invention is to provide a solid-state laser device having surgical applications due to a high absorption in tissues, thereby allowing surface treatments without penetration to underlying cells.

Another object of the present invention is to provide a laser device in which a holmium-doped host material (crystal or amorphous material) is pumped in the near IR range.

Another object of the present invention is to create a laser device capable of efficient energy conversion from readily available neodymium lasers to 2.85 to 3.02 μm radiation suitable for medical, industrial, and military systems.

Still another object of the present invention is to create a direct laser pumping system which reduces the heating in a holmium-doped host material as compared to lamp pumping and thereby improves laser performance.

The above objects and others are met by providing a solid-state laser device which includes a neodymium laser pumping source capable of outputting a pump beam of about 1.1 μm wavelength, and a holmium laser being pumped by the 1.1 μm pump beam to generate an output laser beam of about 3 μm wavelength.

The holmium laser may be disposed in a separate cavity from the neodymium laser in one embodiment, or alternatively, the holmium laser and the neodymium laser may be disposed in overlapping cavities. The overlapping cavity arrangement is particularly suitable for instances where the holmium optical depth at 1.1 μm in a particular host material is too long to efficiently absorb the pump radiation in a single pass. In these instances, the energy transfer can be enhanced by placing the holmium laser material inside the neodymium laser cavity, in an overlapping arrangement.

These and other features and advantages of the solid-state laser device according to the present invention will become more apparent with reference to the following detailed description and drawings.

DETAILED DESCRIPTION OF THE PREFERRED EMBODIMENTS

Figure 1:
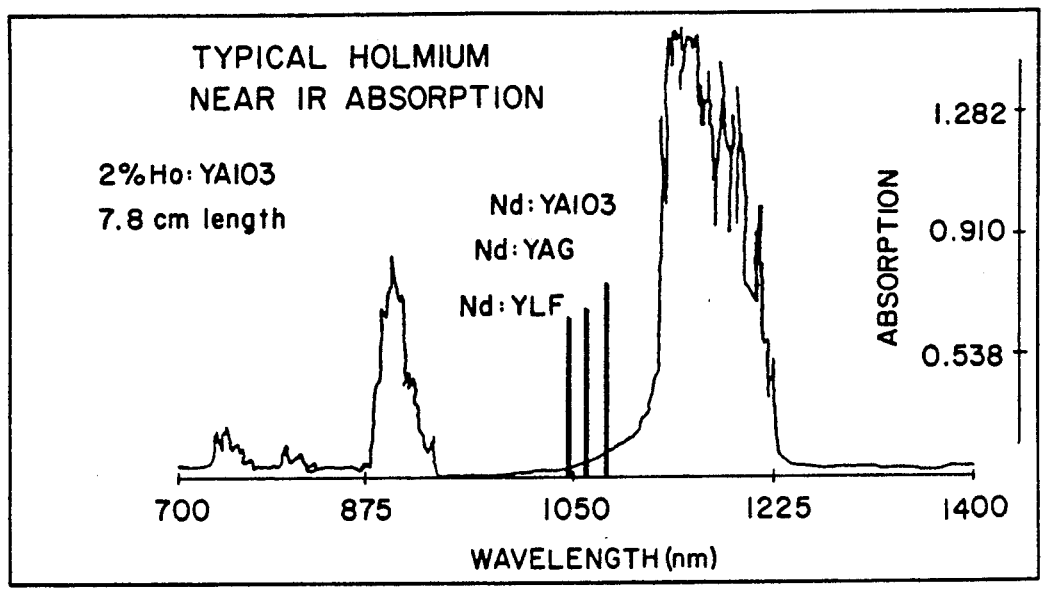
FIG. 1 is a chart showing typical holmium near infrared absorption for a 2% Ho:YAlO$_3$ laser crystal at a typical length of 7.8 cm.
Figure 2:
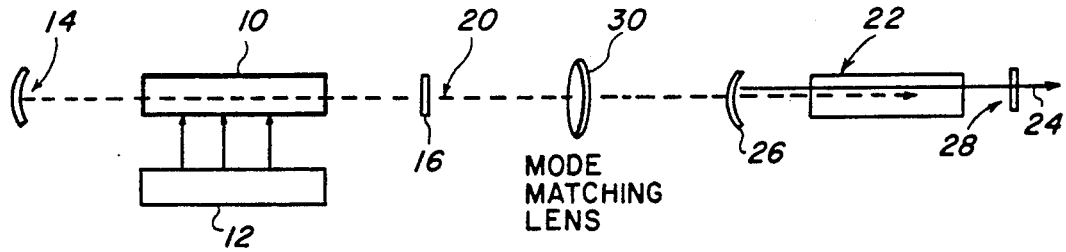
FIG. 2 is a schematic view of a solid-state laser device according to a first embodiment of the present invention.

Referring now to FIG. 1, the vertical bars on the spectra indicate the principal wavelength of several neodymium lasers. These neodymium lasers can be efficiently pumped with flashlamps, arclamps, or laser diodes. In FIG. 2, a neodymium-doped host material 10 is pumped by a pump source 12, such as a flashlamp, arclamp or laser diode. The neodymium-doped host material 10 is rod-shaped with mirrors placed at each end of the rod. A 1.1 μm totally reflective mirror 14 is disposed at one end of the rod 10 and a 1.1 μm partially reflective mirror 16 is disposed at the other end of the rod.

Light from the pump source 12 enters the laser rod and excites the light-emitting neodymium atoms. A reflective cavity (not shown) can be used to focus the pump light onto the laser rod 10. The cavity mirrors (the totally reflective mirror 14 and partially reflective mirror 16) form a resonant cavity that includes the inverted population in the laser rod 10, thus providing the feedback needed to generate a laser beam that emerges from the partially reflective mirror 16. The partially reflective mirror 16 acts as an output mirror for a 1.1 μm pump laser beam 20. This 1.1 μm beam is used to directly pump a holmium-doped host material or holmium laser 22. A 3 μm laser beam 24 is generated as an output beam from the holmium laser 22 using a 3 μm totally reflective mirror 26, which is 1 μm transmissive, and a 3 μm partially reflective mirror 28 which acts as an output mirror. A mode matching lens 30 can optionally be disposed in the path of the 1.1 μm beam 20 between the output mirror 16 and the mirror 26.

Extensions of this embodiment can include: a frequency conversion device inside the holmium resonator or just outside the 3 μm resonator, after the 3 μm output mirror 28. A temporal switch can be included in the neodymium or holmium resonator. A tuning element can also be placed in the holmium laser cavity.

The embodiment of the present invention thus illustrated in FIG. 2 provides efficient direct pumping of holmium ions with neodymium lasers when the 1.1 μm optical depth is comparable to the crystal length.

Figure 3:
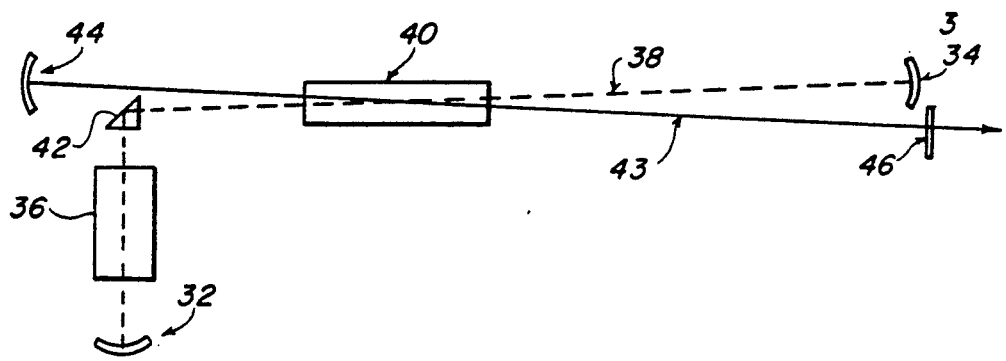
FIG. 3 is a schematic view of a second embodiment of a solid-state laser device according to the present invention.

In some cases, the holmium optical depth at 1.1 μm and a particular holmium-doped host material is too long to efficiently absorb the pump radiation in a single pass. In these cases, the energy transfer can be enhanced by placing the holmium-doped host material inside the neodymium laser cavity, as shown in FIG. 3, in an overlapping arrangement. In FIG. 3, a laser resonator includes a 1.1 μm totally reflective mirror 32 and a 1.1 μm totally reflective mirror 34. A flashlamp pumped neodymium-doped host material 36 produces a 1.1 μm pump beam 38 which is directed into a holmium-doped host material 40 by a right angled prism 42 which acts as a turning element. The pumped holmium-doped host material 40 produces a 3 μm laser beam 43 in conjunction with a 3 μm totally reflective mirror 44 and a 3 μm partially reflective mirror 46. With the holmium-doped host material 40 inside the neodymium resonator, the amount of energy deposited depends on the ratio of the insertion loss of the holmium-doped host material to the round trip cavity loss. With a high Q cavity, the absorption of the 1.1 μm beam in the holmium-doped host material can be made the dominant loss. In this way an approximately 67% useful pumping of a 2% holmium YAlO$_3$ crystal with a single pass absorption of 19% using a flashlamp pump neodymium YAlO$_3$ laser at 1.08 μm can be accomplished. The result was a 2.9 μm holmium laser with an 8% optical to optical slope efficiency and a 60 millijoules threshold. It should be understood, however, that other configurations of this embodiment will result in different values of the pump absorption, slope efficiency and threshold.

Efficient energy conversion from readily available neodymium lasers to 2.9 μm radiation should make existing medical, industrial and military laser systems more useful. Using state of the art laser diode pumped neodymium lasers, an all solid-state 2.9 μm laser with 1% overall efficiency is possible with the present invention. Moreover, direct pumping of the holmium $^5I_6$ level avoids immediate population of the $^5I_7$ level which is detrimental to 2.9 μm laser operation. Direct laser pumping also reduces heating in the holmium-doped host material as compared to lamp pumping and thereby provides better laser performance. The intra-cavity pumping technique described with respect to FIG. 3 can also be used to pump any laser medium where absorption of the desired pump is weak and conversion of the absorbed energy of the desired excited states is efficient.

The present invention has been experimentally tested using the wing absorption of the holmium $^5I_6$ level to allow for pumping with a 1.08 μm line of a Nd:YAlO$_3$ laser. At the holmium doping level of 2% atomic this absorption was found to be only 0.028 cm$^{-1}$. An intra-cavity laser pumping device was tested and found to have good efficiency. A separate 3 μm cavity angled slightly from the 1.08 μm cavity contains the Ho:YAlO$_3$ rod, a MgF$_2$ Brewster waveplate as a birefringent filter and germanium Brewster polarizers. Intra-cavity power for the neodymium laser was monitored so the absorption pump power could be calculated. With this pumping scheme, an 8% optical to optical slope efficiency was demonstrated with a 60 millijoule threshold for the Ho:YAlO$_3$ laser with no tuning element.

For the tuning experiments, a 7.6 cm long holmium laser crystal was pumped along the A axis with the 1 μm pump beam linearly polarized parallel to the polarization of the 3 μm beam. Laser action in the 3 μm regime is very susceptible to water vapor absorption and therefore the laser resonators and diagnostic equipment were contained within a chamber which was purged of atmospheric water vapor using dry nitrogen. Laser wavelengths were measured with a 0.32 meter scanning monochrometer with a 0.5 nm accuracy.

For the case of laser action polarized parallel to the C axis of the holmium crystals, the 2919 nm had the strongest transition. When atmospheric water vapor was purged the transition at 2856 nm was almost as strong. Weaker transitions at 2843, 2845, 2855, 2871 and 3021 nm were observed at twice the threshold pumping level. Single line operation at all of these wavelengths was observed with no evidence of line hopping due to self-termination. When the laser crystal was rotated so that the polarization was parallel to the B axis, the strongest transition occurred at 2858 nm. The minimum threshold for this orientation was about 70% higher than for the C axis polarization. Weaker transitions for this orientation were observed at 2855, 2856, and 2919 nm. At 1.4 times the threshold pumping level the laser was continuously tunable over 4.0 nm at the 2.85 μm regime.

The arrangement illustrated in FIG. 3 is essentially a device to increase the fraction of pump energy absorbed, based on the creation of a multiple-pass absorption in the holmium laser rods. Essentially, two overlapping cavities are created, with each containing the holmium laser rod. These cavities were angled slightly with respect to each other and high reflection mirrors were used for the 1.08 μm cavity to maximize the absorbed energy in the holmium-doped rod (herein the 1.1 μm absorption has been referred to in the experimental set up as the 1.08 μm absorption).

It should therefore readily be understood that many modifications and variations of the present invention are possible within the purview of the invention. For example, possible modifications could include: a frequency conversion device outside of the 3 μm resonator and after the 3 μm output mirror, a temporal switch inside the holmium or neodymium resonator cavity, and a tuning element inside the holmium laser cavity. Many possible host materials, both crystalline and amorphous, can be doped with either neodymium or holmium to create the neodymium-doped host material laser and the holmium-doped host material laser. Such host materials can include, for example, YAG, YAlO, YLF, GSGG, or glasses such as Q-246, LHG-5 and LHG-760. In addition, other dopants, other than neodymium or holmium can be added to the host materials to either sensitize the host material to the pump radiation, or change the relaxation times of neodymium or holmium energy levels to make them more favorable to the performance of the device. It is therefore to be understood that within the scope of the appended claims, the invention may be practiced otherwise than as specifically described.

What is claimed and desired to be secured by letters patent of the United States is:

1. A solid-state laser device comprising:
   a holmium laser having a first host material doped with an amount of holmium ions sufficient to produce an output laser emission at about 3 μm when said holmium ions in said holmium laser are pumped by a pump beam at a wavelength of about 1.1 μm; and neodymium laser pump source means for supplying a pump beam to pump said holmium ions in said holmium laser at a wavelength of about 1.1 μm.

2. The solid-state laser device of claim 1 wherein said neodymium laser pump source means includes:
   a pump source; and
   a neodymium laser pumped by said pump source to produce said 1.1 μm pump beam.

3. The solid-state laser device of claim 2 wherein:
   said pump source is selected from the group consisting of a flashlamp, an arclamp and a laser diode.

4. The solid-state laser device of claim 1 wherein said neodymium laser includes:
   a first laser cavity defined by a 1.1 μm partially reflective mirror and a 1 μm totally reflective mirror opposing each other on a first common axis to form a reflective path therebetween;
   a second host material disposed in said laser cavity, said second material being doped with an amount of neodymium ions sufficient to produce said 1.1 μm pump beam when pumped by said pump source.

5. The solid state laser device of claim 4 wherein:
   said second host material of said neodymium laser is a crystalline or amorphous material.

6. The solid-state laser device of claim 4 wherein said holmium laser includes:
   a second laser cavity defined by a 3 μm totally reflective mirror transmissive to said 1.1 μm pump beam and 3 μm partially reflective mirror opposing each other on a second common axis to form a second reflective path therebetween;
   said holmium-doped first host material being disposed in said second laser cavity and being responsive to said 1.1 μm pump beam for producing said laser emission at about 3 μm, said 3 μm partially reflective mirror outputting said laser emission at about 3 μm.

7. The solid-state laser device of claim 6 further including:
   a mode matching lens disposed between said neodymium laser and said holmium laser crystal.

8. The solid-state laser device of claim 1 wherein:
   said neodymium laser pump source means includes a neodymium-doped second host material disposed in a resonator which includes first and second 1.1 μm totally reflective mirrors;
   said holmium-doped first host material is disposed in said resonator; and
   said solid-state laser device further includes a 3 μm totally reflective mirror disposed at one end of said holmium-doped first host material and a 3 μm partially reflective mirror disposed at the other end of said holmium-doped host material for outputting said output laser emission at about 3 μm.

9. The solid-state laser device of claim 8 wherein:
   said 3 μm partially reflective mirror outputs a laser emission at a wavelength of substantially 2.9 μm.

10. The solid-state laser device of claim 8 further including:
    an intra-cavity tuning element disposed between said first 1.1 μm totally reflective mirror and said holmium-doped host material for tuning said output laser emission.

11. The solid-state laser device of claim 1 wherein:
    said first host material is comprised of $YAlO_3$; and
    said $YAlO_3$ host material is doped with an amount of holmium ions of about 2% (atomic %).

12. The solid-state laser device of claim 1 wherein:
    said first host material of said holmium laser is a crystalline or amorphous material.

* * * * *